O. STALHANE & O. O. KRING.
METHOD AND APPARATUS FOR DISTILLATION OF LIQUIDS.
APPLICATION FILED DEC. 20, 1916.
1,277,659.
Patented Sept. 3, 1918.
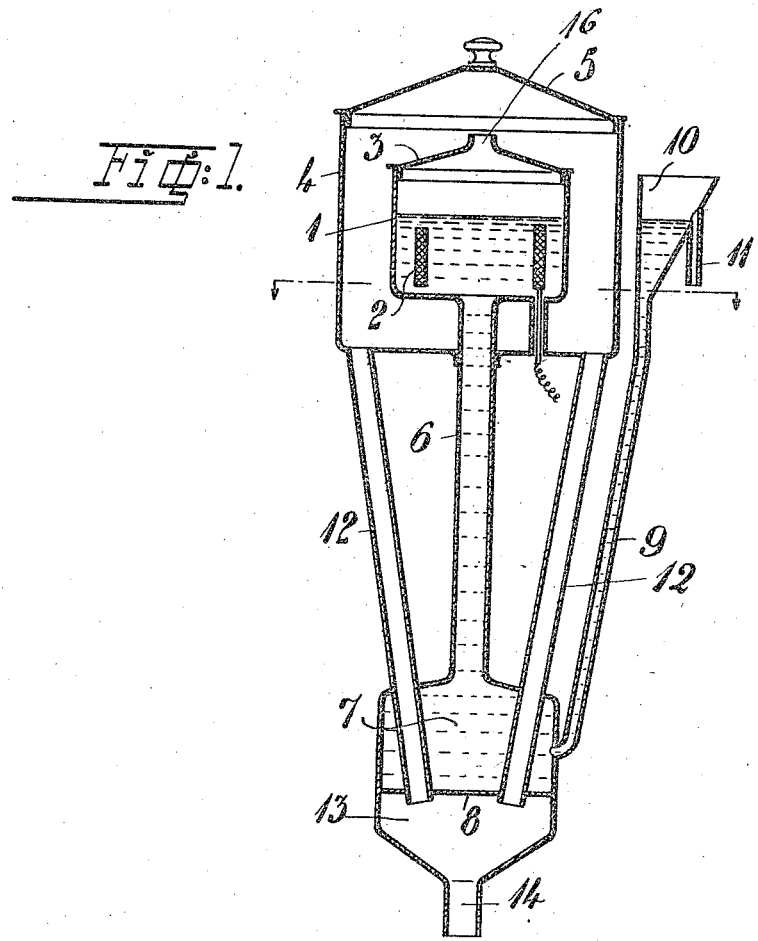
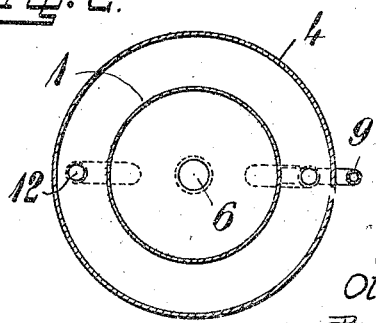
Inventors
Otto Stålhane
Olof Oskar Kring
By Wm. Wallace White
Attorney

UNITED STATES PATENT OFFICE.

OTTO STÅLHANE AND OLOF OSKAR KRING, OF LUDVIKA, SWEDEN.

METHOD AND APPARATUS FOR DISTILLATION OF LIQUIDS.

1,277,659.   Specification of Letters Patent.   Patented Sept. 3, 1918.

Application filed December 20, 1916. Serial No. 137,951.

*To all whom it may concern:*

Be it known that we, OTTO STÅLHANE and OLOF OSKAR KRING, engineers, subjects of the King of Sweden, and residing at Ludvika, in the Kingdom of Sweden, have invented certain new and useful Improvements in Methods and Apparatus for Distillation of Liquids.

This invention has for its object a method of distilling water and other liquids and an apparatus for carrying out this method. The purpose of the invention is to arrange the apparatus in such a manner, that the greatest possible part of the heat, which by preference is generated electrically, is utilized for the evaporation of the liquid. This will be obtained according to the present invention in such a way, that the vapor, generated at the distillation, is brought to pass from the distilling vessel around the same in such a manner, that it by said hot steam or vapors will be protected from loss of heat, besides which at the parts of said vessel, which have a lower temperature than the escaping vapors, heat is transmitted to it from the escaping vapors. In order further to utilize the heat of the vapors and to cool same and to cool the condensed products the heat of these vapors and of the condensed products may be employed to preheat the liquid to be distilled.

In order to illustrate the invention a vertical section of a distilling apparatus, constructed in accordance with the present invention, is, by way of example, shown on the accompanying drawing in Figure 1. Fig. 2 is a horizontal section after the dotted line in Fig. 1.

1 is the distilling vessel, in which the exaporation of the liquid is effected for instance by means of an electric heating element 2 of suitable construction. To prevent sprinkling the vessel 1 is provided with a cover, at the top provided with one or several openings. The vessel 1 is surrounded by an outer vessel 4 (or casing), closed at the top by a cover 5. From the bottom of the vessel 1 the pipe 6 extends through the bottom of the vessel 4 and leads into another vessel 7, provided with an intermedial bottom 8 and intended as receptacle for the liquid to be treated. Thus the vessels 1 and 7 communicate with each other through the pipe 6. The vessel 7 communicates through the pipe 9 with the hopper 10, which is provided with an outlet pipe 11 or the like, so that the level of the liquid in the vessel 1 will be kept constant by continuously supplying the hopper 10 with a sufficient quantity of liquid. From the bottom of the vessel 4 a number of pipes 12 extend downward, passing through the vessel 7 and the intermedial bottom 8 and opening into the chamber 13 below said bottom 8. When the liquid is brought to boil in the vessel 1, the vapors will escape through the opening 16 of the cover 3, fill the space between the vessel 1 and the vessel 4 and then pass down through the pipes 12, where they are cooled and condensed at first by the cooling action of the air surrounding the pipes 12 and thereafter by the cooling action of the liquid in the vessel 7 which at the same time gets heated by the distilling products passing through the pipes 12. The liquid thus preheated in the vessel 7 rises through the pipe 6 into the vessel 1 where it is evaporated. The products of distillation are collected in the chamber 13 and flow away through the pipe 14.

It is obvious, that by this arrangement a most complete heat-insulation of the distilling vessel 1 will be obtained, so that practically all electric energy supplied to the heating element is utilized for evaporation of the liquid.

Details of the apparatus can of course be varied without departing from the spirit of this invention. Thus the condensation of the vapors can be effected in another way for instance by aircooling only or by water-cooling only. Moreover, the apparatus can be provided with devices for separation of different gases or vapors and so forth.

Having thus described our invention, we declare, that what we claim is:

An apparatus for distilling liquid, comprising a distilling vessel, means for heating the liquid in said vessel, a casing surrounding said vessel and spaced therefrom, a liquid supply vessel disposed below said distilling vessel and formed with an intermediate bottom, a pipe connecting the top of said supply vessel to the bottom of said distilling vessel, steam outlet pipes for said casing passing through said supply vessel and the intermediate bottom thereof, and a supply pipe having means for preventing the liquid therein and in said distilling vessel from rising above a predetermined level.

In witness whereof we have hereunto set our hands in presence of two witnesses.

OTTO STÅLHANE.
OLOF OSKAR KRING.

Witnesses:
OSCAR PETTERSSON.
OLAV TINLSRUD.